Figure 1:
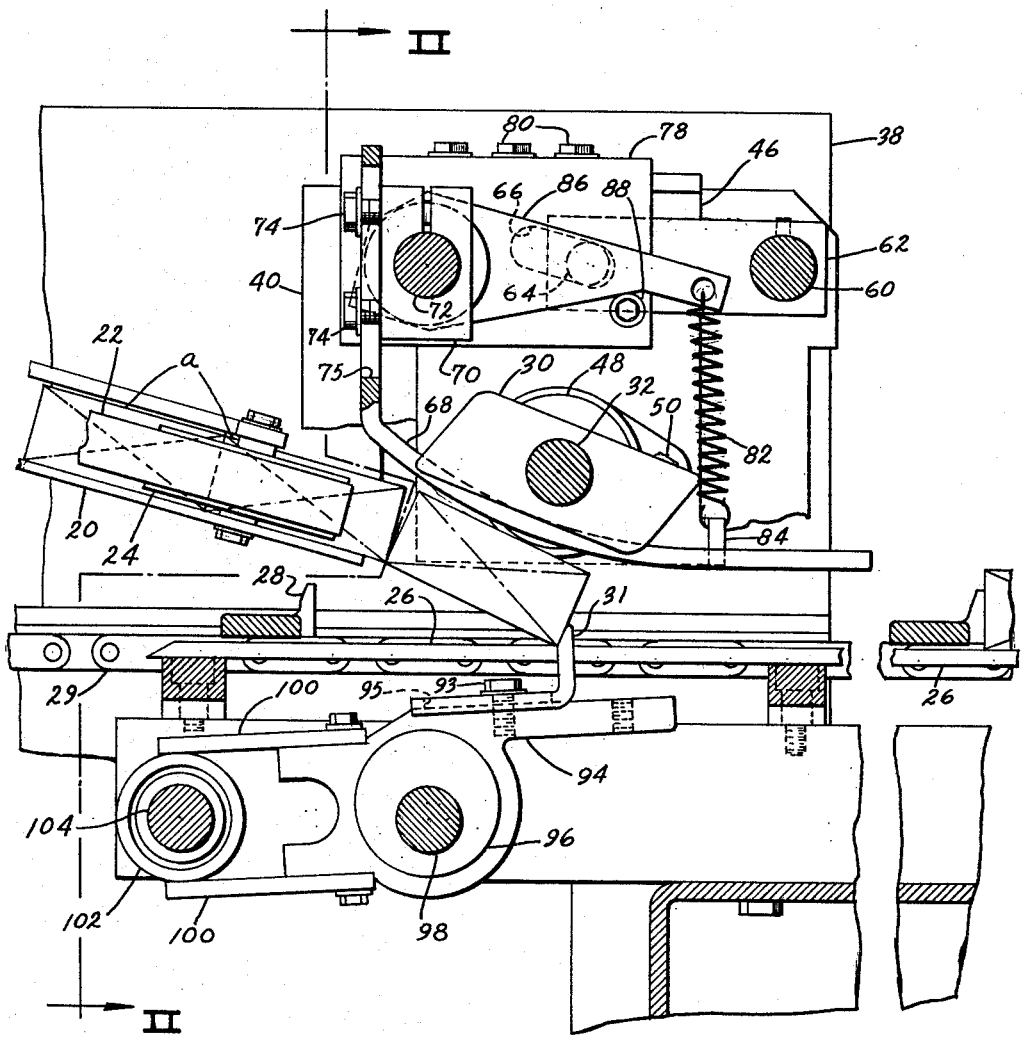

Oct. 8, 1963     C. B. CROSS     3,106,279
ARTICLE FEEDING AND SEPARATING DEVICE
Filed May 10, 1962     4 Sheets-Sheet 1

INVENTOR.
CEDRIC B. CROSS
BY Chapin & Neal
Attorneys

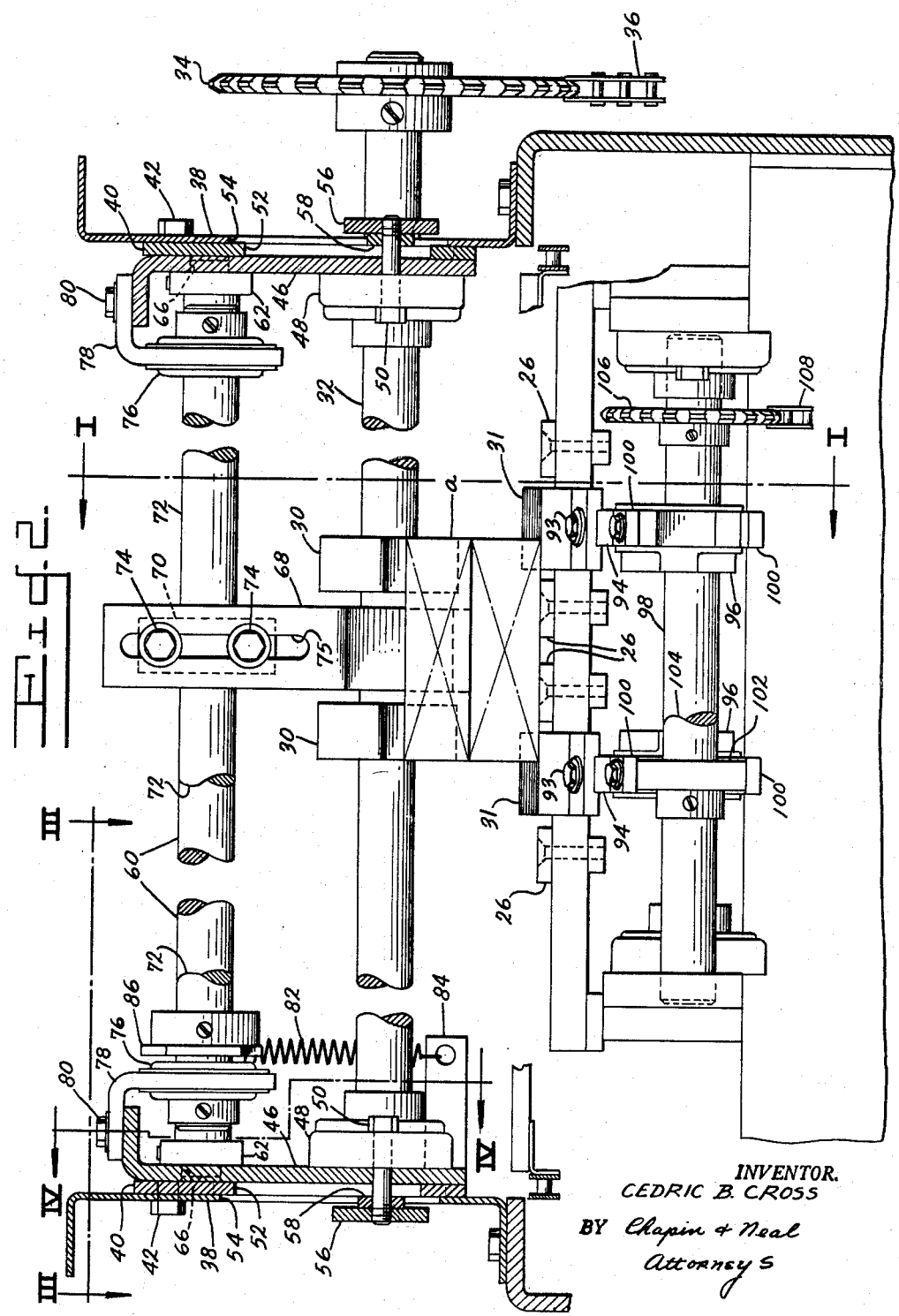

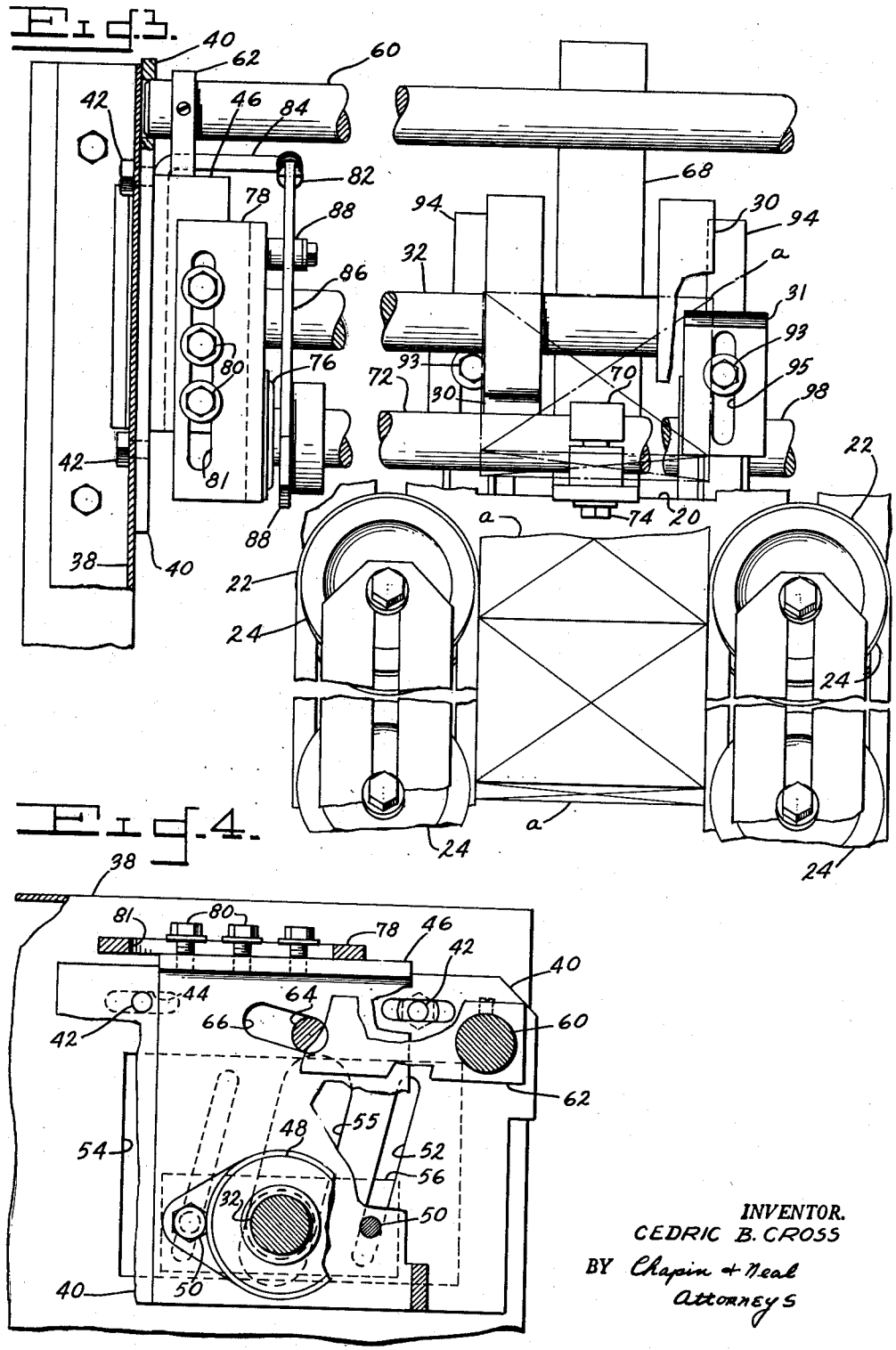

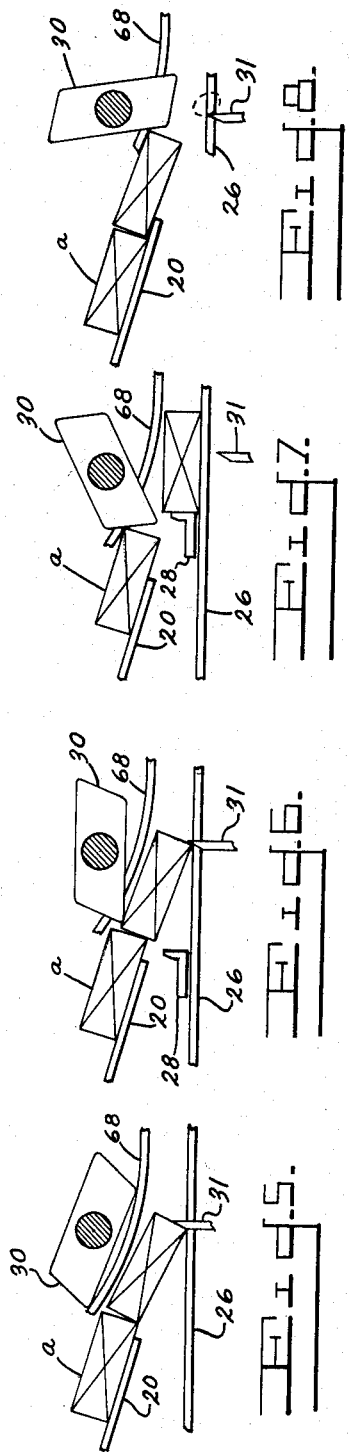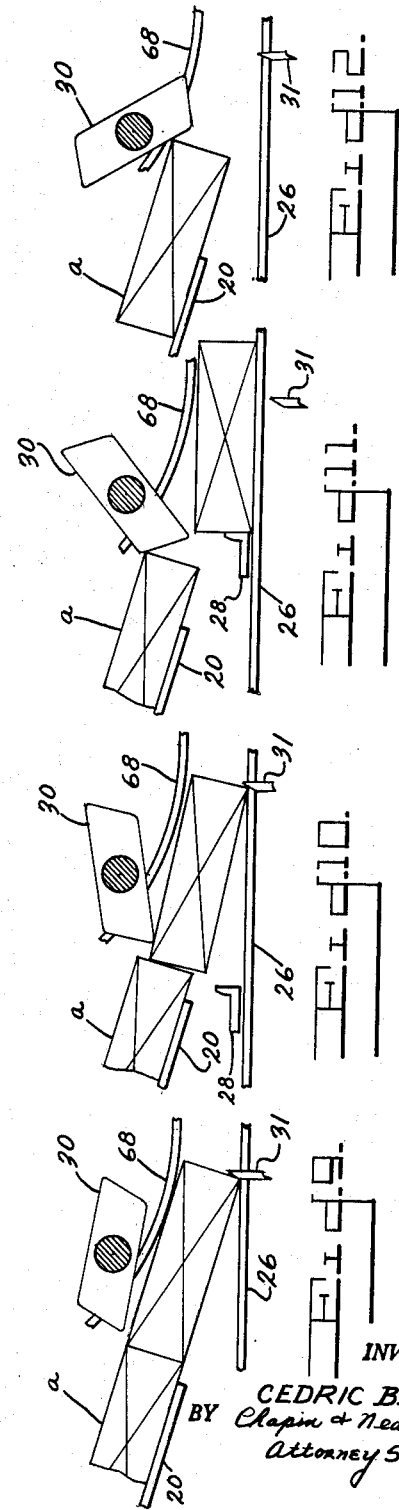

United States Patent Office 3,106,279
Patented Oct. 8, 1963

3,106,279
ARTICLE FEEDING AND SEPARATING DEVICE
Cedric B. Cross, Monson, Mass., assignor to Package Machinery Company, East Longmeadow, Mass., a corporation of Massachusetts
Filed May 10, 1962, Ser. No. 193,778
10 Claims. (Cl. 198—25)

The present invention relates to improvements in devices for separating articles, and particularly the leading article of a line of abutting articles so that individual articles may then be fed to a wrapping machine or other machine for subsequently treating the separated articles.

The object of the invention is to provide a feeding and separating device which is capable of handling articles through a wide range of sizes with a minimum of adjustment and change parts for a given size range.

Such feeding and separating devices are most frequently employed in combination with wrapping machines so that articles fed at random onto a moving belt conveyor may later be separated and spaced apart at the infeed of the wrapping machine. Present day wrapping machines are capable of operating at speeds of upward of 400 articles a minute which requires a very high degree of efficiency in the feeding operation because of the lost machine production which will build up quite rapidly when a breakdown occurs. This factor also motivates the need for a feeding device which is capable of handling a wide range of article sizes with a minimum of time being required to change from one size of article to another. By minimizing the amount of adjustments needed and the number of change parts required, this changeover time may be drastically reduced. This is not to neglect the more obvious advantages which are found in having a fewer number of parts capable of separating several sizes of articles.

The device of the present invention is characterized by a first platform having a terminal end and means for advancing a line of abutting articles over the platform towards this terminal end. A second platform is disposed beneath the first platform with conveyor means being provided to advance articles therealong. Separating means are provided at the terminal end of the first platform and comprise a generally oblong separator which is rotated about an axis transverse to the direction of advance of the line of articles and spaced above and outwardly of the terminal end of the first platform. The separator, as it rotates, permits the line of articles to advance therebeneath into engagement with a stop finger. Further rotation of the separator displaces the leading article onto said second platform and brings it into obstructive relation with the path of advance of the line of articles. At this point the stop finger is retracted from obstructive relation with the leading article and the leading article is then advanced along the second platform by the conveyor means provided. Further rotation of the separator again permits the leading article of the line of articles to be advanced with engagement to the stop finger for subsequent separation of the leading article of the line.

It has been found that the length of the oblong separator is not critical and that by using a preferred diamond-shape that a great variation in the longitudinal dimension of the articles may be tolerated. In most instances it is possible to separate articles of different sizes simply by varying the position of the axis of rotation of the separator and/or the position of the stop finger from the terminal end of the first platform.

The above and other related objects and features of the invention will be apparent from a reading of the following description of the disclosure found in the accompanying drawings and the novelty thereof pointed out in the appended claims:

In the drawings:
FIG. 1 is an elevation of a feeding and separating device embodying the present invention with portions thereof broken away on line I—I in FIG. 2;
FIG. 2 is a section taken generally on line II—II in FIG. 1;
FIG. 3 is a section taken generally on line III—III in FIG. 2;
FIG. 4 is a section taken generally on line IV—IV in FIG. 2;
FIGS. 5, 6, 7 and 8 are sequential views illustrating the operation of the present device; and
FIGS. 9, 10, 11 and 12 are sequential views illustrating the operation of the same device on larger size articles.

Referring first to FIGS. 1 and 2, the present device comprises a first platform 20 along which a line of abutting articles $a$ are advanced by a pair of side belts 22. The belts 22 (FIG. 3) are trained around driven pulleys 24, and frictionally engage the end faces of the articles $a$ to advance them toward the terminal end of the platform 20 at the right hand end thereof. The pressure of the belts against the articles is adjusted so that the line of articles may be stopped, at least temporarily, without any damage being done to the articles.

The platform 20 is angled downwardly towards a second platform, formed by rails 26, spaced therebeneath. Separating means in the form of a pair of generally oblong separators 30 are disposed adjacent and outwardly of the terminal end of the first platform 20. In operation, the separators 30 rotate to successively displace the leading article $a$, from the line of articles, onto the platform 26. In this separating operation stop fingers 31 move from a position below the platform 26 to a position thereabove to cooperate with the separator 30 in a manner more fully described hereinafter. Conveyor means comprising spaced flights 28 advance each separated article along the platform 26 in spaced apart relation.

The flights 28 are secured at their opposite ends to chains 29 which are driven in an appropriate manner to move the flights 28 in accordance with the functional relationships hereinafter described. The separators 30 are secured to a rotatable shaft 32 having a sprocket 34 secured to one end thereof and driven by a chain 36 in a manner and at a rate appropriate to attain the functional relationships incident to the separating operation.

The shaft 32 is mounted in a manner providing for adjustment of the separators 30 in both a vertical and longitudinal relationship relative to the terminal end of the platform 20. The primary support for the shaft 32 comprises frame members 38 having plates 40 secured to the inner faces thereof by screws 42. The screws 42 pass through slots 44 in the frames 38 and are threaded into the plates 40.

A pair of angle plates 46 are disposed between the plates 40 and bearings 48 which rotatably receive opposite ends of the shaft 32. Screws 50 (FIGS. 2 and 4) pass through flanges on the bearings 48, then through holes in the angle plates 46 and then through slots 52 in the plates 40 into openings 54 in the frames 38. Clearance slots 55 are also provided in plates 40 for the shaft 32 which passes through clearance holes in the angle plates 46. The screws 50 of each bearing 48 are threaded into retainers 56 which are spaced from the plates 40 by washers 58. Screws 50 thus secure both the plates 46 and bearings 48 respectively to the plates 40. With this arrangement it is possible to vertically adjust the separators 30 when the screws 50 are loosened. The shaft 32 may be raised and lowered and is preferably guided by the slots 52 in a plane perpendicular to the first platform 20. In any given vertical position in which the shaft 32 is disposed, it is then possible by loosening the screws 42 to move the separators in a longitudinal direction towards or away from the terminal end of the platform 20. Usually it is contemplated that a simple vertical adjustment in a plane normal to the platform 20 will suffice. It is also preferable that an idler pulley be provided to bear against the driving chain 36 so that it may be adjustably positioned to accommodate heightwise and longitudinal variations in the position of shaft 32.

The following means are provided to assist in maintaining the opposite ends of the shaft 32 at the same level. A shaft 60 (FIGS. 3 and 4) is journaled on the plates 40 and has secured thereto a pair of arms 62 which project in overlapping relation with the angle plates 46. Studs 64 project from the arm 62 into slots 66 formed in the angle plates 46 parallel to the platform 20. The action of the arms 62 and projecting studs 64 is to maintain the angle plates 46 and bearings 34 at the same height as the shaft 32 is adjusted vertically.

A top guide 68 is disposed between the separators 30 to displace or assist in displacing the leading article *a* towards the second platform 26. The top guide is secured to a block 70 which in turn is clamped onto a shaft 72 by screws 74. Slot 75 (FIG. 2) in the top guide 68 permits it to be adjusted in a vertical direction independently of the separators 30. The shaft 72 is pivotally mounted in bearings 76 which are supported in angle brackets 78, the angle brackets being secured to the angle plates 46 by screws 80. The screws 80 pass through slots 81 (FIG. 3) in the brackets 78 to provide for longitudinal adjustment of the top guide 68 independently of the separators 30. The top guide 68 is yieldingly held in its illustrated position by a spring 82 which extends from an inwardly bent finger 84, on one of the angle plates 46, to an arm 86 which is fastened to the shaft 72. The arm 86 engages a stop screw 88, threaded into the adjacent angle bracket 78, to position the top guide 68. This arrangement as viewed in FIG. 1 permits the top guide 68 to yield in the direction of article advance in case a jam should occur or some other misalignment of the articles result.

The mounting of the stop fingers 31 (FIGS. 1, 2 and 3) will now be described. Each stop finger is secured to a bracket 94 by screws 93 passing through slots 95 therein. The brackets 94 each rotatably receive an eccentric 96 which is secured to a shaft 98. A pair of plates 100 are secured to each bracket 94 and embraces a ball bearing 102 which is mounted on a shaft 104. A sprocket 106 is secured to shaft 98 and driven from an appropriate power source through chain 108 to rotate the shaft 98 and cause the fingers 31 to move first above and then below the level of the platform 26 in the described timed relationship. Slots 95 permit the fingers 31 to be adjusted toward and away from the terminal end of the platform 20 to accommodate various lengths of packages.

The longitudinal and heightwise adjustments herein described will accommodate a wider variation in height and length of package. Additionally the separators 30, fingers 31 and belts 22 are also adjustable laterally to better accommodate a wide range of package widths.

The operation of the present device may best be understood with reference to FIGS. 5-8. In FIG. 5 the leading article of the line of the articles *a* is urged into engagement with the stop finger 31 as the separator 30 is in a position allowing the articles to pass therebeneath. In FIG. 6 it will be seen that as the separator 30 rotates, it engages the upper rear corner of the article and displaces that article toward the platform 26 as the separator swings into obstructive relation with the line of advance of the articles. It will be noted in FIG. 7 that the preferable shape of the separators 30 is not only generally oblong, but also of a parallelogram configuration in which the face of the separator which is in obstructive relation with the line of articles is angled away from the outermost corner of the separator so that there is no tendency to try to displace the line of articles in a reverse direction.

In FIG. 7 it will also be seen that the stop finger 31 has been displaced below the level of the platform 26 and the separated article has now been advanced past the separators 30 by the flight 28 so that it will not be crushed by a continued rotation of the separators. As indicated in FIG. 8, further rotation of the separators 30 allows the leading article *a* to be displaced towards the platform 26 as the stop finger 31 starts to move to a position above the platform 26 and into obstructive relation with the advance of the line of articles. The line of articles next moves into engagement with the stop finger 31 as the separator 30 is rotated to a position in which the line may pass therebeneath, illustrated again in FIG. 5, whereupon the cycle of operation is repeated.

FIGS. 9, 10, 11 and 12 illustrate the operation of the separating elements wherein larger articles are being handled. The shaft 32 has been raised to properly dispose the separators 30 so that they can rotate to a position in which the articles may pass therebeneath and then to a position in obstructive relation with the line of advance of the articles. Further, the stop fingers 31 have been adjusted outwardly of the terminal end of the platform 20 a distance somewhat greater than the length of the articles. With these simple adjustments FIGS. 9 through 12 illustrate the manner in which the articles are separated, without need of a further description.

In the present separating device the articles are positively displaced so that such terms as "below" and "heightwise" are for convenience in terms of reference only.

Having thus described the invention, what is claimed as novel and desired to be secured by Letters Patent of the United States is:

1. A device for feeding and separating articles, said device comprising a first platform having a terminal end, means for advancing a line of abutting articles over said platform towards said terminal end, a second platform disposed beneath said first platform, a generally oblong separator rotatable about an axis transverse to the direction of advance of said line of articles, said separator being rotatable from a position intersecting the path of advance of said line of articles to a position clear thereof, a finger, means for moving said finger into obstructive relation with said line of articles when said separator is clear thereof, and moving said finger clear of said line of articles when said separator intersects the path of advance of said articles whereby articles will be displaced by said separator onto said second platform and means for advancing said separated articles along said second platform in spaced apart relation.

2. A device for feeding and separating articles, said device comprising a first platform having a terminal end, means for advancing a line of abutting articles over said platform towards said terminal end, a second platform disposed beneath said first platform, said first platform being angled downwardly towards said second platform, a generally oblong separator rotatable about an axis transverse to the direction of advance of said line of articles, said separator being rotatable from a position intersecting the path of advance of said line of articles to a position clear thereof, said separator being spaced from the terminal end of said first platform and engaging the leading article adjacent the trailing end thereof, a stop finger, means for moving said finger into obstructive relation with said line of articles when said separator is clear thereof and for moving said finger clear of said line of articles when said separator intersects the path of advance of said articles whereby the leading article in said line will be displaced by said separator onto said second platform and means for advancing said leading article along said second platform whereby successive articles will be spaced apart on said second platform.

3. A feeding and separating device as in claim 2 wherein the shorter faces of the oblong separator form, at their leading ends, opposed acute corners with the longer faces of the separator, said corners engaging the articles and further wherein the short faces extend progressively radially inwardly from said acute corners to oblique corners formed with the opposite longer faces of the separator.

4. A feeding and separating device as in claim 2 wherein a top guide is provided adjacent and above the line of advance of said articles on said first platform and extending therebeyond to guide said articles towards said second platform.

5. A feeding and separating device as in claim 2 wherein means are provided for adjusting the axis of rotation of said separator in both a heightwise and longitudinal direction.

6. A device for feeding and separating articles, said device comprising a first platform having a terminal end, means for advancing a line of abutting articles over said platform, a second platform disposed beneath said first platform, said first platform being angled downwardly towards said second platform, a rotatable shaft disposed above said first platform and outwardly of the second terminal end, a generally oblong separator mounted on said shaft and rotatable therewith from a position intersecting the path of advance of said line of articles to a position clear thereof, said separator being spaced from the terminal end of said platform and engaging the leading article adjacent the trailing end thereof, a stop finger, means for moving said finger above said second platform and into obstructive relation with said line of articles when said separator is clear thereof, and for moving said finger below said second platform when said separator intersects said path of advance of said articles whereby the leading article in said line will be displaced by said separator onto said second platform, means for advancing said leading article along said second platform whereby successive articles will be spaced apart on said second platform, and means for adjustably positioning said shaft in a plane normal to said first platform.

7. A feeding and separating device as in claim 6 wherein the stop finger has a component of movement in the direction of article feed when above said second platform and moving towards its position therebeneath.

8. A feeding and separating device as in claim 6 wherein there are a pair of opposed side frames on opposite sides of said platform, a pair of plates are secured to said frames, said plates being adjustable longitudinally of said platforms, a pair of bracket plates are secured against said plates and a pair of journals receiving opposite ends of said shaft are held in fixed relation relative to said bracket plates, said journals and bracket plates being adjustable relative to said plates in a plane normal to said first platform and means for holding the journals and bracket plates in adjusted position.

9. A feeding and separating device as in claim 8 wherein a top guide is provided adjacent and above the line of advance of said articles on said first platform and extending therebeyond to guide said articles toward said second platform, said top guide being supported from said bracket plates whereby it is adjustable with said separator.

10. A feeding and separating device as in claim 9 wherein the top guide is independently adjustable relative to said separator in both longitudinal and heightwise directions.

References Cited in the file of this patent
UNITED STATES PATENTS
2,912,092    Cross _____ Nov. 10, 1959